UNITED STATES PATENT OFFICE.

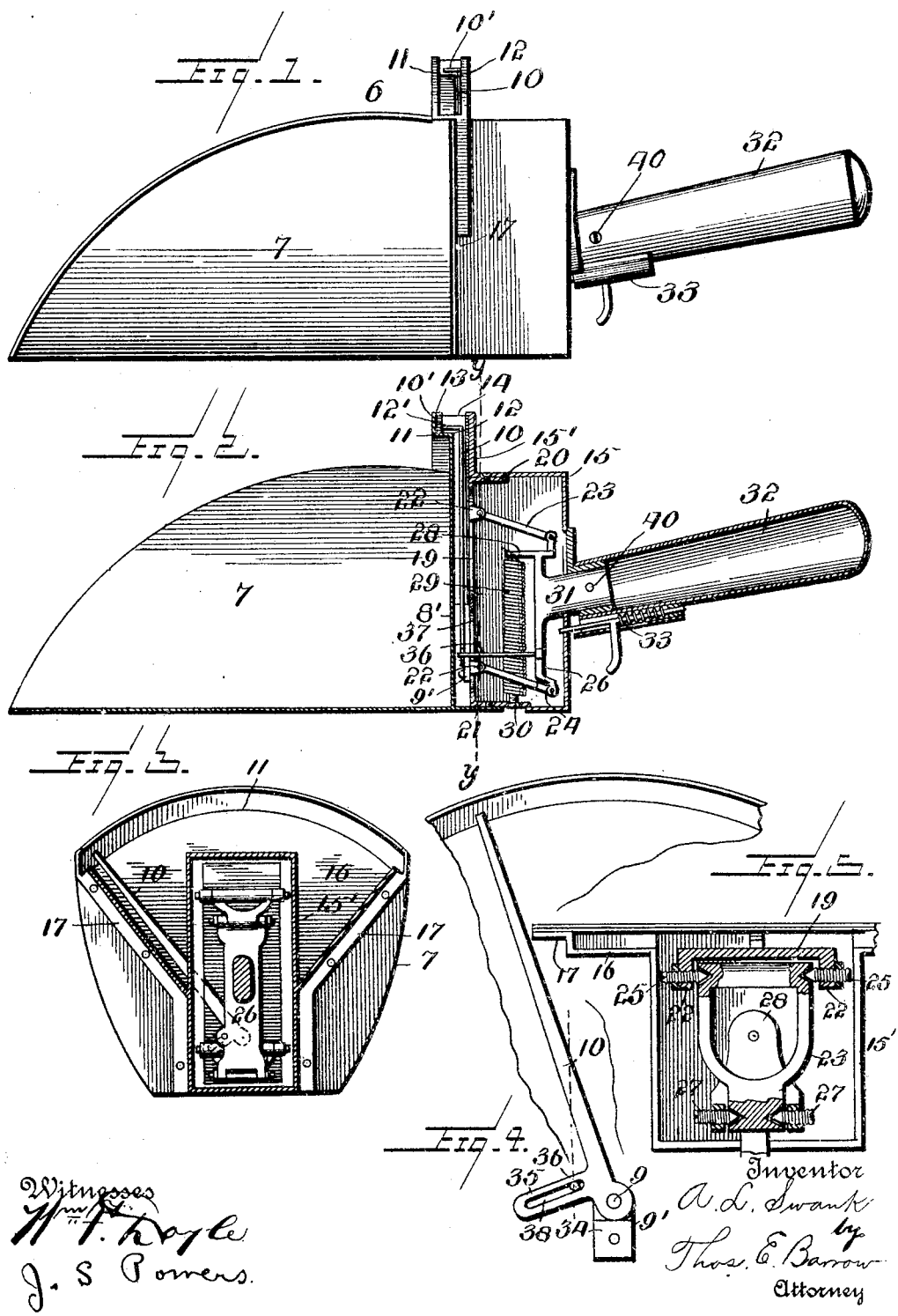

ARTHUR L. SWANK, OF BATTLECREEK, MICHIGAN.

CONTENTS-INDICATOR FOR RECEPTACLES.

No. 807,333.     Specification of Letters Patent.     Patented Dec. 12, 1905.

Application filed October 22, 1903. Serial No. 178,136.

*To all whom it may concern:*

Be it known that I, ARTHUR L. SWANK, a citizen of the United States, residing at Battlecreek, in the county of Calhoun and State of Michigan, have invented certain new and useful Improvements in Contents-Indicators for Receptacles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means combined with a scoop, vessel, or other receptacle for indicating the weight of or other data relating to the contents of a receptacle substantially as described and claimed herein.

In the accompanying drawings, Figure 1 is a side elevation of my improved scoop. Fig. 2 is a vertical sectional elevation of the same lengthwise. Fig. 3 is a transverse sectional view taken through the weighing mechanism. Fig. 4 is a detail view of the indicator and the weighing mechanism. Fig. 5 is a horizontal sectional view of the weighing mechanism, taken on line $y\ y$, Fig. 2.

In the several figures, 6 indicates the body of the scoop, which is of the ordinary semicylindrical form having the side walls 7 and the back wall 8, the latter extending over the side walls 7 and being formed with horizontal ledge 12, a vertical portion 12', and a horizontal flange 13. The ledge 12 is graduated to indicate pounds, ounces, &c., and the pointer 10' of the swinging indicator or arm 10 extends over the said graduated ledge at right angles to the body of the indicator. A strip of transparent material, such as mica, is secured within the flange 13 of the back wall 8, and a corresponding flange 15' is formed on the casing 15 for the weighing mechanism. The said casing 15 for the weighing mechanism is formed with lateral flanges 17, that are secured by screws to the back wall, thus leaving a space 8' between the back wall and the casing of the weighing mechanism in which the indicator-arm 10 is free to move.

The casing 15 is of rectangular form and contains the spring and levers of the weighing mechanism. A metal plate 19, having a flange 20 at the top and a flange 21 at the bottom, is bolted within the rectangular extension 15' of the casing 15. The levers 23 and 24 of the weighing mechanism are pivotally secured at one end to lugs 22 22, at the edges of the plate 19, between screws 25 25, which have cone-shaped points that fit similarly-shaped cavities in the said levers or links 23 24, and at the other or outer ends the said links are pivoted on vertical bar 26 by screws 27 27, similar to the screws 25 25 of the plate 19, and the bar 26 has ears on which said levers 23 and 24 are engaged. The bar or portion 26 is rigid with handle 32 and has a horizontal arm 28 near its top, to which is attached the upper end of the balance-spring 29, while the lower end of said spring is attached to the flange 21 of the plate 19 by an adjustment-screw 30, said plate being rigid with the scoop, and arm 31, rigid with upright part 26, extends into handle 32 and is rigidly secured therein at 40.

A spring-pressed bolt 33, arranged on the bottom of the handle, is adapted to project into a hole in the back wall of casing 15 to fix the scoop and weighing mechanism and the handle rigidly together. When, however, the said bolt is withdrawn from engagement with the said casing, the scoop is free to move up and down in respect to the handle, the weight of the scoop and its contents being then thrown upon the balance-spring 29.

The indicator-arm 10 is pivoted at 9, between the bracket 9' and the plate 19, and is formed with a lateral extension 35 at its bottom, having a slot 38, in which works a pin 36, passing through a slot 37 in the plate 19 and attached to the vertical bar 26, and said indicator swings transversely of the scoops, as shown.

The operation of my invention is as follows: The position of the parts when the scoop is being used in the ordinary manner to scoop up material is shown in Fig. 2. When this occurs, spring-bolt 33 is in locking engagement with the casing of the weighing mechanism and holds all the said parts rigid with each other. When the scoop has been filled, as may be desired, the said bolt 33 is drawn back, releasing the scoop and at once resting its weight upon the weighing mechanism. Then the scoop will drop downward a distance in respect to the handle dependent upon the weight of its contents, and the weight of the contents will be indicated by the pointer 10' upon the scale on ledge 12, the weight of the scoop, and the weighing mechanism.

While I have shown this invention in combination with an ordinary grocer's scoop, the invention is not limited to such a scoop or to any particular scoop, vessel, or receptacle, as it may be used in combination with any sort of receptacle adapted to receive contents that may be weighed or other data relating thereto indicated.

What I claim as my invention, and desire to secure by Letters Patent, is—

1. The combination of a receptacle, a horizontal handle therefor with reference to which the receptacle is vertically movable, and mechanism mounted on the receptacle and connected with the handle for indicating data relative to the contents of the receptacle.

2. The combination of a receptacle, a handle therefor relatively to which the receptacle is vertically movable, an indicator mounted on the receptacle and actuated by the vertical movement thereof, and a scale along which the indicator moves.

3. The combination of a receptacle, a handle therefor relatively to which the receptacle is vertically movable, an indicator pivoted on the receptacle, a connection between the indicator and the handle whereby the vertical movement of said receptacle will actuate the indicator, and a scale along which the indicator moves.

4. The combination of a receptacle, a handle therefor relatively to which the receptacle is vertically movable, an indicator pivoted on the receptacle and movable transversely of the handle by the vertical movement of the receptacle, and a scale along which the indicator moves.

5. The combination of a receptacle, a horizontally-extending handle therefor relatively to which the receptacle is vertically movable, a vertical indicator that is movable transversely of the handle by the vertical movement of the receptacle, and a scale along which the indicator moves.

6. The combination of a receptacle, a handle therefor relatively to which the receptacle is vertically movable, an indicator actuated by the vertical movement of the receptacle and a scale on the receptacle and along which the indicator moves.

7. The combination of a receptacle, a handle therefor relatively to which the receptacle is vertically movable, an indicator actuated by the vertical movement of the receptacle, and a scale on the receptacle extending throughout the width of the receptacle along which the indicator moves.

8. The combination of a receptacle provided with a vertical chamber adjacent thereto, a handle extending into the chamber and relatively to which the receptacle and chamber are vertically movable, and indicating means within said chamber that is actuated by such movement.

9. The combination of a receptacle provided with a vertical chamber adjacent thereto, a handle extending into the chamber through a vertical slot, a connection within the chamber between the receptacle and the handle which permits the vertical movement of the chamber relatively to the handle, and an indicator within the chamber that is actuated by such movement.

10. The combination of a receptacle provided with a vertical chamber adjacent thereto, a handle extending into said chamber through a vertical slot, a spring connected at its upper end with said handle and at its lower end with the lower wall of said chamber, whereby the receptacle is vertically movable relatively to the handle, and an indicator in said chamber that is actuated by such movement.

11. The combination of a receptacle with a vertical chamber adjacent thereto, a handle extending into said chamber through a vertical slot, a spring connected with said handle that supports said receptacle and chamber and permits their vertical movement, upper and lower pivoted arms connecting said receptacle and handle for maintaining the relative position of said handle and receptacle, and an indicator in said chamber that is actuated by the vertical movement of said receptacle.

12. The combination of a receptacle provided with a vertical chamber adjacent thereto, a handle extending into the chamber with reference to which said receptacle and chamber are vertically movable, a spring for holding the receptacle and chamber normally in an upper position relatively to the handle, and means mounted on the handle for engaging the wall of said chamber and positively holding said chamber and receptacle in such upper position until the release of said means.

13. The combination of a receptacle, a handle therefor, a spring engaging said parts, and an indicator pivoted to swing transversely between said receptacle and handle, substantially as described.

14. The combination of a receptacle, a handle for the support thereof, a connection between the receptacle and the handle that permits the vertical movement of the receptacle relatively to the handle, and a transversely-movable indicator between said handle and receptacle and pivoted at its lower end centrally between the sides of the receptacle over the bottom thereof, substantially as set forth.

15. The combination of a receptacle, a handle therefor, a connection between the handle and receptacle that permits the vertical movement of the receptacle relatively to the handle, and an indicator pivoted on a fixed support at its lower end to the wall of the receptacle between the handle and receptacle and adapted to swing transversely of the receptacle and operatively connected with said handle near its pivotal point.

16. The combination of a receptacle, a casing secured thereto to form a vertical chamber adjacent said receptacle, a handle independent of said casing, a connection between the handle and the receptacle comprising parallel upper and lower links, a spring connected at one end with said receptacle and at the other end with said handle, and a transversely-movable indicator between said handle and receptacle.

17. The combination of a receptacle, a handle for the support thereof, a connection between the receptacle and handle that permits the vertical movement of the receptacle with reference to the handle, and means for locking the receptacle rigidly to the handle comprising a bolt supported on the handle and slidable lengthwise thereof, substantially as set forth.

18. The combination of a receptacle having a wall that extends transversely of said receptacle, a transversely-extending scale on said wall, a handle, a connection between the handle and the receptacle that permits the vertical movement of the receptacle relatively to the handle, and an indicator pivoted to the receptacle and adapted to indicate the extent of movement of said receptacle.

19. The combination of a receptacle having a wall at one side projecting above the other sides thereof and forming a horizontal ledge, a scale on said ledge that extends transversely of the receptacle, a handle to support the receptacle provided with a vertical plate on its inner end, parallel upper and lower links connecting the upper and lower ends of said plate with said receptacle, a spring connected at its upper end with said plate and at its lower end with said receptacle which permits the vertical movement of said receptacle relatively to the handle, and an indicator fulcrumed on said receptacle with an arm extending from the lower end thereof and pivoted to said vertical plate, whereby the vertical movement of said receptacle will actuate said indicator.

In testimony whereof I affix my signature in presence of two witnesses.

ARTHUR L. SWANK.

Witnesses:
 B. A. BARTON,
 T. B. MARTIN.